United States Patent
Laraia et al.

(12) 
(10) Patent No.: US 12,442,346 B2
(45) Date of Patent: Oct. 14, 2025

(54) METHOD TO ADJUST AN INTERNAL COMBUSTION ENGINE AND INTERNAL COMBUSTION ENGINE

(71) Applicant: FERRARI S.P.A., Modena (IT)

(72) Inventors: Lorenzo Laraia, Modena (IT); Daniele Genova, Modena (IT); Giovanni Sartoni, Modena (IT)

(73) Assignee: FERRARI S.P.A., Modena (IT)

( * ) Notice: Subject to any disclaimer, the term of this patent is extended or adjusted under 35 U.S.C. 154(b) by 101 days.

(21) Appl. No.: 18/412,850

(22) Filed: Jan. 15, 2024

(65) Prior Publication Data
US 2024/0240598 A1 Jul. 18, 2024

(30) Foreign Application Priority Data
Jan. 17, 2023 (IT) .......................... 102023000000576

(51) Int. Cl.
| | | |
|---|---|---|
| *B60T 7/12* | (2006.01) | |
| *F01L 1/34* | (2006.01) | |
| *F02D 41/00* | (2006.01) | |
| *F02D 43/04* | (2006.01) | |
| *F02P 5/15* | (2006.01) | |

(52) U.S. Cl.
CPC .............. *F02D 43/04* (2013.01); *F01L 1/34* (2013.01); *F02D 41/0002* (2013.01); *F02P 5/15* (2013.01)

(58) Field of Classification Search
CPC ............... F02D 37/02; F02D 41/0085; F02D 2200/1002; F02D 2250/18; F01N 2430/08
USPC ......................................................... 701/105
See application file for complete search history.

(56) References Cited

U.S. PATENT DOCUMENTS

| | | | |
|---|---|---|---|
| 9,863,334 B2 * | 1/2018 | Arikai | F02D 41/045 |
| 2012/0035834 A1 * | 2/2012 | Takahashi | F02P 5/1502 |
| | | | 701/105 |
| 2018/0135546 A1 * | 5/2018 | Tsuyuki | F02D 41/0245 |

(Continued)

FOREIGN PATENT DOCUMENTS

| | | |
|---|---|---|
| DE | 102005047829 B3 | 5/2007 |
| DE | 102009000088 A1 | 7/2010 |

(Continued)

OTHER PUBLICATIONS

Italian Search Report and Written Opinion in IT Application No. 202300000576, mailed Jul. 11, 2023 (7 pages) an English translation attached hereto.

*Primary Examiner* — Logan M Kraft
*Assistant Examiner* — James J Kim
(74) *Attorney, Agent, or Firm* — Leason Ellis LLP

(57) ABSTRACT

A method to adjust an internal combustion engine is described, comprising the steps of: i) controlling a first and second adjustment member so as to adjust a first and second quantity of air in a first and second cylinder provided with a first and second piston; ii) operating a first and second ignition member with a first and second advance angle relative to the first and second top dead centre of the first and second piston; iii) processing a value of one of the amplitudes associated with a respective frequency of a driving member; iv) detecting that the amplitude at a corresponding desired frequency exceeds a threshold value; v) reducing the first advance angle; and vi) increasing the first quantity of air so as to maintain the average value of the resulting torque constant at two complete rotations of said driving member.

21 Claims, 8 Drawing Sheets

(56) References Cited

U.S. PATENT DOCUMENTS

| | | | |
|---|---|---|---|
| 2020/0003137 A1* | 1/2020 | Pedder | F02D 19/081 |
| 2021/0079869 A1* | 3/2021 | Takayama | F02D 41/021 |
| 2021/0199059 A1* | 7/2021 | Yamane | F02D 11/105 |
| 2023/0079934 A1* | 3/2023 | Oryoji | F02D 41/068 60/320 |

FOREIGN PATENT DOCUMENTS

| | | |
|---|---|---|
| DE | 112009001425 B4 | 7/2016 |
| DE | 102016204269 B3 | 6/2017 |
| DE | 102016219582 B3 | 6/2017 |

* cited by examiner

METHOD TO ADJUST AN INTERNAL COMBUSTION ENGINE AND INTERNAL COMBUSTION ENGINE

CROSS-REFERENCE TO RELATED APPLICATIONS

This patent application claims priority from Italian patent application no. 102023000000576 filed on 17 Jan. 2023, the entire disclosure of which is incorporated herein by reference.

TECHNICAL FIELD

This invention relates to a method to adjust an internal combustion engine.

This invention also relates to an internal combustion engine.

BACKGROUND

Internal combustion engines are known of the type comprising:
  multiple cylinders inside of which corresponding pistons can slide, as a result of the execution of a thermodynamic cycle; and
  a drive shaft coupled to the pistons via multiple respective connecting rod-crank mechanisms.

Each cylinder also comprises, in a known way, a corresponding head defining, with the corresponding piston, a corresponding volume chamber than can be varied as a result of the piston's sliding.

In particular, each piston can slide inside the corresponding cylinder between a relative bottom dead centre and a relative top dead centre.

At the relative bottom dead centre, the volume of the chamber assumes the maximum value. At the relative top dead centre, the volume of the chamber assumes the minimum value.

The internal combustion engine also comprises, for each cylinder and corresponding piston:
  a corresponding intake valve that can be operated to introduce a quantity of fresh air inside the corresponding chamber;
  a corresponding injection member that can be operated to inject fuel inside the corresponding chamber;
  a corresponding ignition member, for example, a spark plug that can be operated to ignite a mixture of fuel and fresh air inside the chamber; and
  a corresponding discharge valve that can be operated to discharge the exhaust gases that are formed from the combustion of the above-mentioned mixture outside the corresponding chamber.

Very briefly, inside each cylinder, fuel and fresh air are cyclically injected and the ignition of the mixture of fuel and fresh air is ignited. This ignition raises the pressure inside the chamber, causing the movement of the piston towards the bottom dead centre and the rotation of the drive shaft. As a result, the mixture of air and fuel is expelled from the chamber.

In a known way, during a complete rotation of the drive shaft, the pressure acting on each piston has a value that can vary as the rotation angle of the drive shaft, i.e. the angle between a direction integral with the drive shaft and a fixed direction, varies.

Due to this variation in pressure, the torque delivered to the drive shaft from a single cylinder and from the corresponding piston also has a value that can vary as the angle of the drive shaft varies.

The resulting torque on the drive shaft corresponds to the sum of the torque applied by the individual cylinders and corresponding pistons, and also has a trend that can vary as the rotation angle of the drive shaft varies.

By suitably staggering the thermodynamic cycles of the individual cylinders, a resulting torque trend can be obtained that is more regular as the rotation angle of the drive shaft varies.

Still more precisely, the variable trend of the resulting torque corresponds to the presence of a basic oscillation frequency corresponding to the frequency of the thermodynamic cycles performed in the cylinders and the secondary frequencies corresponding to whole multiples of the basic oscillation frequency.

It is possible to identify the oscillation frequency with reference to the rotation frequency of the drive shaft. In particular, the order of the oscillation frequency corresponds to half of the number of events for every two complete rotations of the drive shaft corresponding to the execution of a complete thermodynamic cycle.

For example, an oscillation frequency equal to double the rotation frequency of the drive shaft is identified as a frequency of the second order.

It is also known to arrange the cylinders of multi-cylinder internal combustion engines into two banks defining a given angle in relation to a rotation axis of the drive shaft. In this way, the so-called V configurations of the internal combustion engine are implemented.

Among these configurations, the one with a total of 12 cylinders, with an angle of 60 degrees between the banks, each comprising six cylinders, is especially widely used in sports or race cars.

In an internal combustion engine having this configuration, the torque has particularly significant amplitudes at the half order, third order, and sixth order.

To reduce the overall dimensions of the internal combustion engine, a configuration with two banks each having six cylinders, and with an angle of 65 degrees between the banks, was proposed.

The Applicant observed that this configuration causes a less regular trend in the torque as the drive angle varies in relation to the configuration with an angle of 60 degrees between the banks, and the resulting appearance of a significant amplitude of the third order.

The need to reduce the amplitude of the third order is felt in the sector, in order to limit the irregular nature of the torque, reduce the overall vibrations associated with the operation of the internal combustion engine, and make the noise generated by this operation more regular, especially at an idle speed.

More precisely, this need is felt both if the above-mentioned oscillation depends on the construction configuration of the internal combustion engine, as in the V12 configuration with 65 degrees between the banks, and if it depends on additional parameters or operational anomalies with reference to different configurations of the internal combustion engine.

SUMMARY

The purpose of this invention is to produce a method to adjust an internal combustion engine, which makes it possible to meet the need mentioned above.

Said aim is achieved by this invention, which relates to a method to adjust an internal combustion engine, according to what is set forth in claim 1.

This invention also relates to an internal combustion engine according to what is defined by claim 14.

BRIEF DESCRIPTION OF THE DRAWINGS

In order to better understand this invention, a non-limiting preferred embodiment thereof will now be described by way of example with reference to the accompanying drawings, in which.

DESCRIPTION OF EMBODIMENTS

Figure 1:
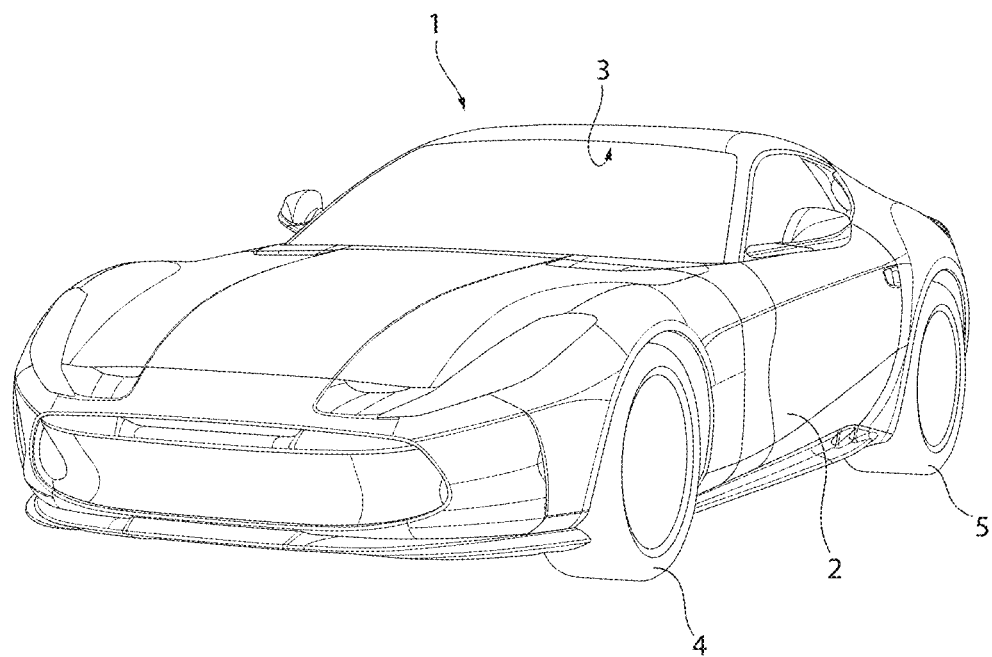
FIG. 1 is a perspective view of a motor vehicle with an internal combustion engine produced according to the precepts of this invention.

With reference to FIG. 1, reference number 1 indicates a motor vehicle comprising a body 2 defining a passenger compartment 3 and multiple wheels 4, 5.

Figure 2:
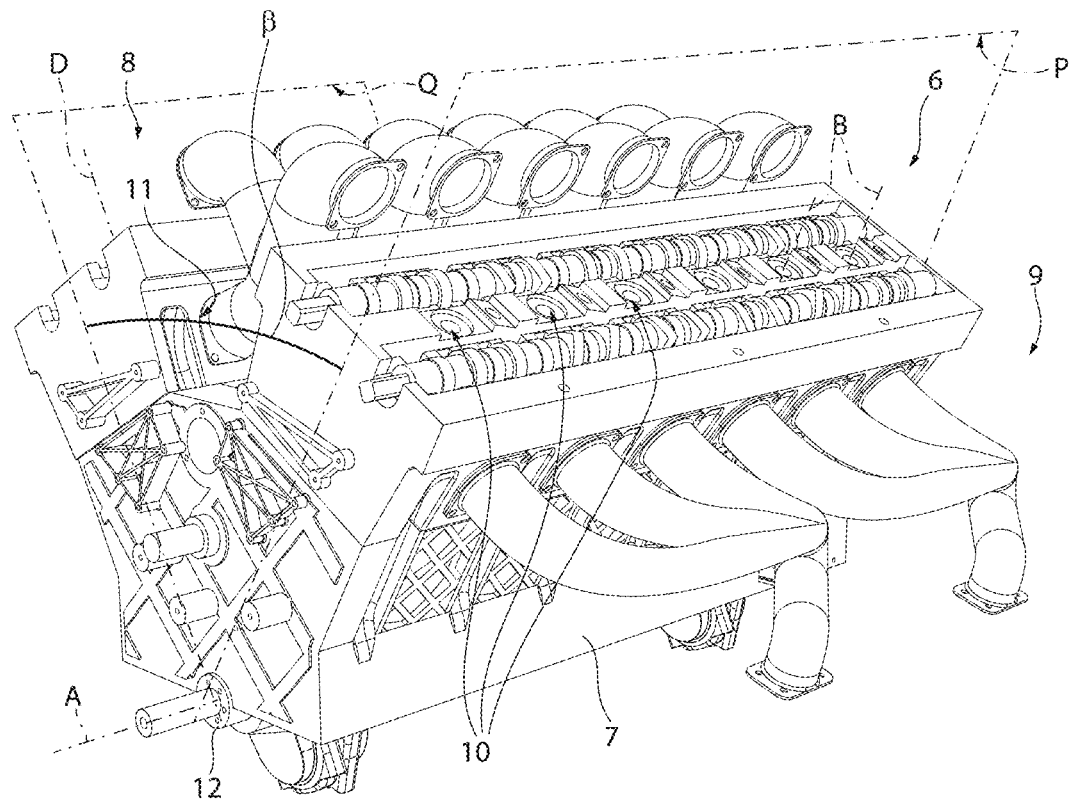
FIG. 2 is a perspective view on an enlarged scale of an internal combustion engine incorporated in the motor vehicle in FIG. 1 and produced according to the precepts of this invention.

In a known way, the motor vehicle 1 comprises an internal combustion engine 6 illustrated in FIG. 2 and designed to provide the torque to the wheels 4, 5.

In more detail, the internal combustion engine 6 comprises:
a base 7 defining a pair of banks 8, 9;
multiple cylinders 10 defined by the bank 8 and having respective axes D;
multiple cylinders 11 defined by the bank 9 and having respective axes C; and
a crank drive shaft 12 (only partially illustrated in FIG. 1) that can rotate around an axis A.

Each bank 8, 9 defines, in the case illustrated, six respective cylinders 10, 11.

The banks 8, 9 have respective extension directions parallel to the axis A and respective midplanes P, Q that are orthogonal to the axis A and contain the above-mentioned extension directions.

In particular, the planes P, Q are parallel to respective axes B, D of corresponding cylinders 10, 11.

In a known way, each cylinder 10, 11 also houses a respective piston 15, 16 so that it can slide along a respective axis B, C.

The banks 8, 9 are symmetrically arranged in relation to the axis A and form a V converging towards the axis A.

More precisely, the axes B, C lie on corresponding planes symmetrically arranged in relation to the axis A and form the V converging towards the axis A.

The internal combustion engine 6 thus produces a V12 configuration.

In the case illustrated, an angle β between the axes D and the corresponding axes C is 65 degrees.

Figure 10:
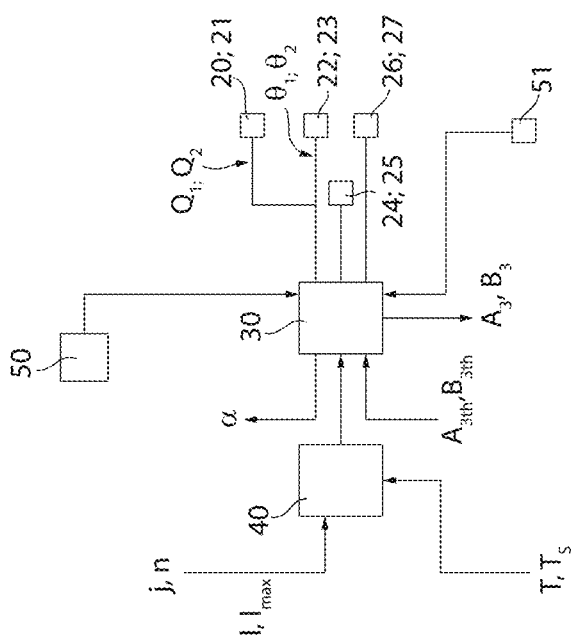
FIG. 10 schematically illustrates the first components of the internal combustion engine produced according to this invention.

With reference to FIG. 10, each cylinder 10, 11 also comprises a corresponding head 13.

Each piston 15, 16 and the head 13 of the corresponding cylinder 10, 11 define a corresponding, variable-volume chamber 17, 18.

In particular, each piston 15, 16 can slide inside the corresponding cylinder 10, 11 between a respective bottom dead centre PMI and a respective top dead centre PMS.

At the respective bottom dead centre PMI, the volume of the chamber 17, 18 assumes the maximum value. At the relative top dead centre PMS, the volume of the chamber 17, 18 assumes the minimum value.

Figure 11:
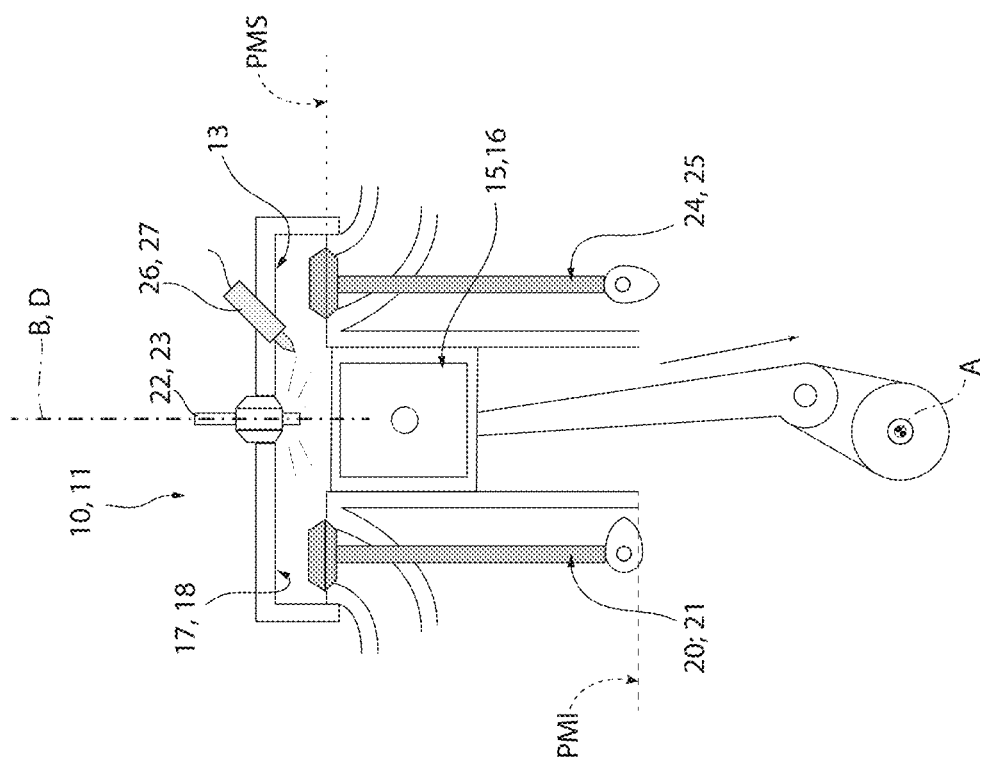
FIG. 11 schematically illustrates the second components of the internal combustion engine produced according to this invention.

Each cylinder 10, 11 also comprises (FIG. 11):
an intake valve 20, 21 that can be operated to introduce a quantity of fresh air Q1, Q2 inside the corresponding chamber 17, 18;
an injection member 26, 27 that can be operated to inject fuel inside the chambers 17, 18;
an ignition member 22, 23, for example a spark plug, that can be operated to ignite a mixture of fuel and fresh air inside the chamber 17, 18; and
a discharge valve 24, 25 that can be operated to discharge the exhaust gases that formed from the combustion of the above-mentioned mixture inside the corresponding chamber 17, 18.

In the example illustrated, the internal combustion engine 6 is a four-stroke engine.

The angular position of the drive shaft 12 around the axis A is identified by an angle α defined between a direction integral with the drive shaft 12 and a direction fixed in relation to the base 7.

The internal combustion engine 6 also comprises a clutch 50 and an accelerator 51 (only schematically illustrated in FIG. 10) that can be operated by a driver.

The clutch 50 can be operated by the driver, in a known way, to mechanically uncouple the drive shaft 12 and the wheels 4, 5. The accelerator 51 can be operated by the driver to adjust the quantities of air Q1, Q2.

Figure 12:
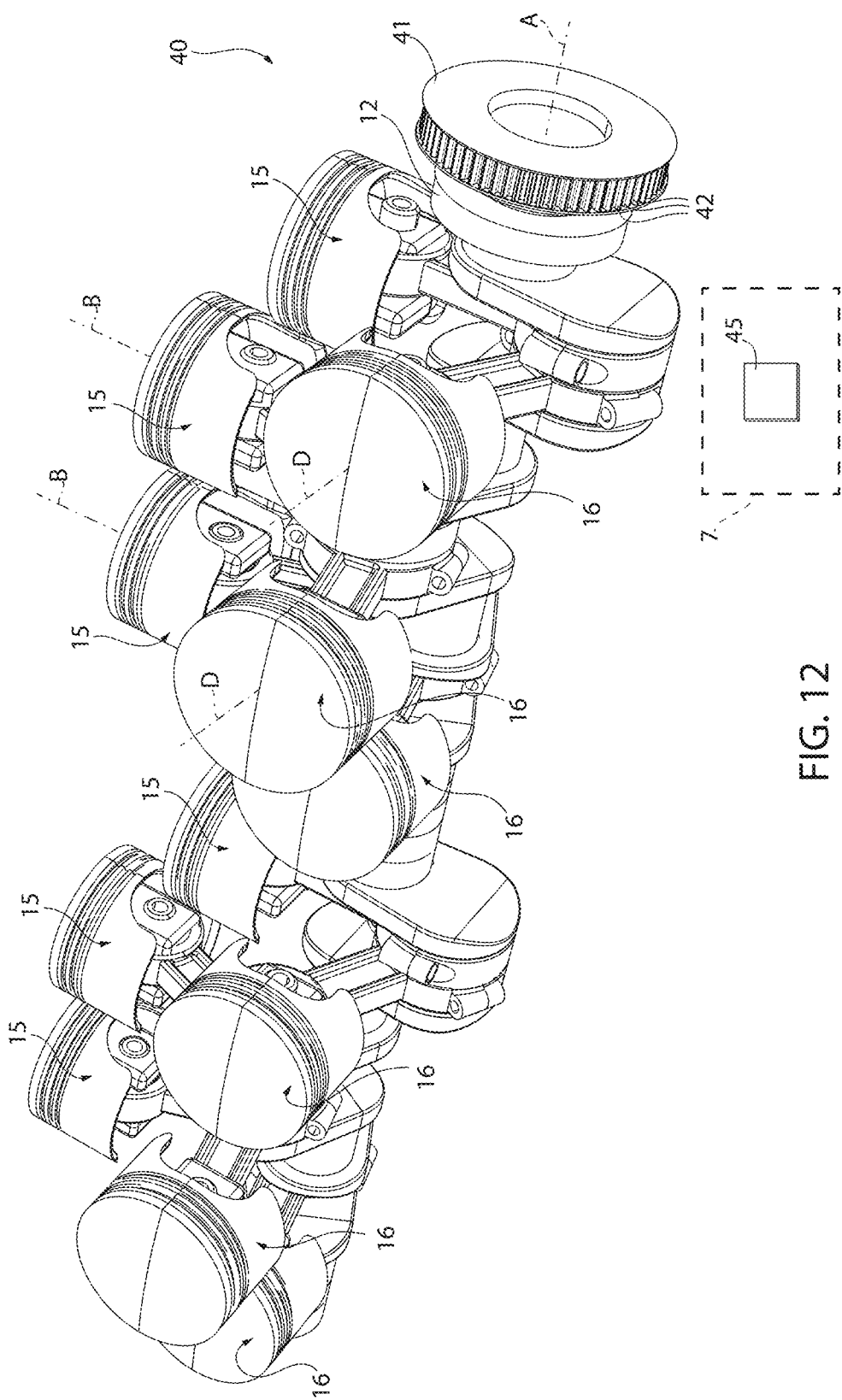
FIG. 12 illustrates, in a perspective view that is further enlarged, additional components of the internal combustion engine produced according to this invention.

With reference to FIG. 12, the internal combustion engine 6 also comprises a transducer 40 designed to generate a signal associated with the angular speed n of the drive shaft 12.

In the example illustrated, the transducer 40 is a phonic wheel and comprises:
- a disc 41 comprising multiple grooves or projections 42 and mounted on the drive shaft 12 so as to rotate integrally with the drive shaft 12; and
- a proximity sensor 45 (only schematically illustrated in FIG. 12) carried by the base 7 and designed to detect the presence of the grooves or projections 42 without physical contact, rotationally fixed to the axis A and facing the disc 41.

The sensor 45 can be optical, capacitive, or inductive.

The sensor 45 also interacts progressively with each groove or projection 42, as a result of the rotation of the drive shaft 12 and the transducer 40 a number i of times for each complete rotation of the drive shaft 12 around the axis A with an angular speed n.

The internal combustion engine 6 also comprises a control unit 30 (only schematically illustrated in FIG. 10) programmed to control the intake valves 20, 21, the injection members 26, 27, the ignition members 22, 23, and the discharge valves 24, 25 according to a predetermined sequence, depending on the angular position of the drive shaft 12.

The control unit 30 is also operationally connected with the clutch 50 and the accelerator 51.

In this way, inside each cylinder 10, 11 a thermodynamic cycle is produced that converts part of the thermal energy released by the combustion of the mixture into mechanical energy so as to cause the sliding of the pistons 15, 16 and the application of a corresponding torque C1, C2, C3, C4, C5, C6; C7, C8, C9, C10, C11, C12 on the drive shaft 12.

The sum of the torques C1, C2, C3, C4, C5, C6; C7, C8, C9, C10, C11, C12 is equal to a resulting torque C acting on the drive shaft 12.

As far as regards the purpose of this invention, it is possible to define, for each cylinder 10, 11 and the corresponding piston 15, 16, an advance angle $\theta 1$, $\theta 2$ of ignition as the distance between the activation point of the corresponding ignition member 22, 23 and the top dead centre PMS of the corresponding piston 15, 16, measured according to the rotation angle $\alpha$ of the drive shaft 12.

Figure 13:
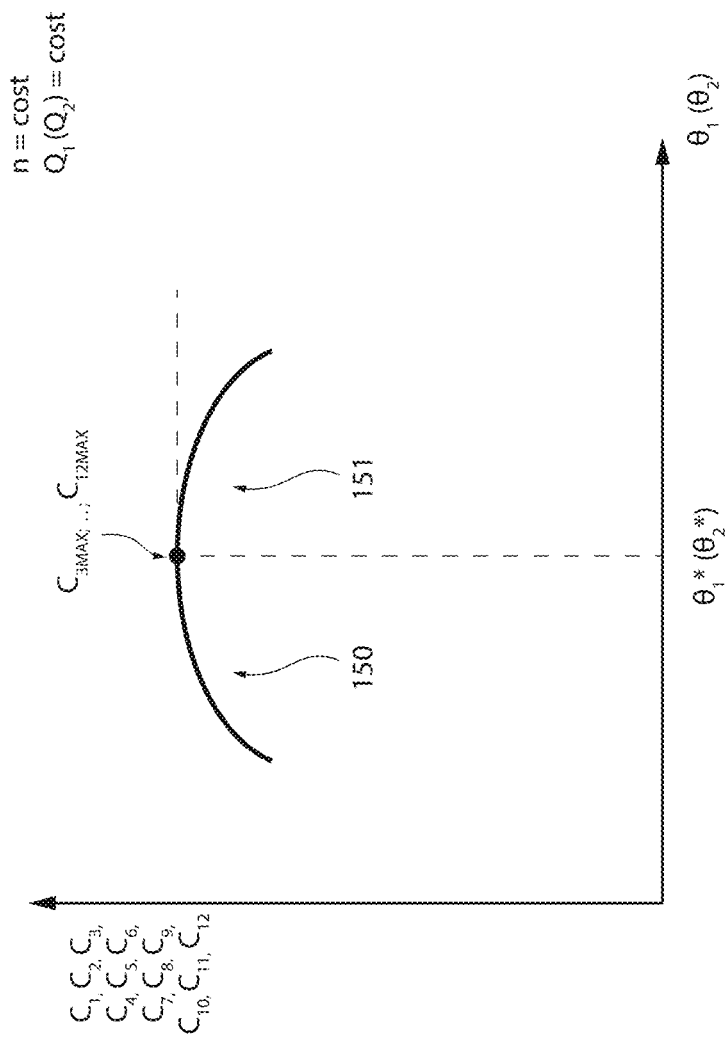
FIG. 13 illustrates the trend of torque delivered by a cylinder of the internal combustion engine produced according to this invention as an ignition advance angle change, for a constant value of quantity of air and rotation speed of the drive shaft.

With reference to FIG. 13, with an equal angular speed n of the drive shaft 12, the trend of the torque C1, C2, C3, C4, C5, C6; C7, C8, C9, C10, C11, C12 generated by the cylinders 10, 11 and corresponding pistons 15, 16 on the drive shaft 12 as the advance angle $\theta 1$, $\theta 2$ changes comprises:
- an increasing segment 150 for values of the advance angles $\theta 1$, $\theta 2$ less than respective values $\theta 1*$, $\theta 2*$; and
- a decreasing segment 151 for advance angles $\theta 1$, $\theta 2$ greater than respective values $\theta 1*$, $\theta 2*$.

It is, in addition, possible to associate, with each cylinder 10, 11 and corresponding piston 15, 16, a value of maximum torque C1max, C2max, C3max, C4max, C5max, C6max; C7max, C8max, C9max, C10max, C11max, C12max delivered at the advance angle $\theta 1*$, $\theta 2*$, with an equal angular speed n of the drive shaft 12 and quantity of air Q1, Q2.

In other words, the advance angles $\theta 1*$, $\theta 2*$ correspond to respective optimal values for which the torque C1, C2, C3, C4, C5, C6, C7, C8, C9, C10, C11, C12 reaches the respective maximum value C1max, C2max, C3max, C4max, C5max, C6max; C7max, C8max, C9max, C10max, C11max, C12max, with an equal angular speed n of the drive shaft 12 and quantity of air Q1, Q2. With an equal angular speed n of the drive shaft 12 and respective advance angle $\theta 1$, $\theta 2$, in addition, the torque C1, C2, C3, C4, C5, C6; C7, C8, C9, C10, C11, C12 generated by the cylinder 10, 11 and by the corresponding piston 15, 16 on the drive shaft 12 increases as the quantity of air Q1, Q2 fed via the corresponding intake valves 20, 21 changes.

Figure 3:
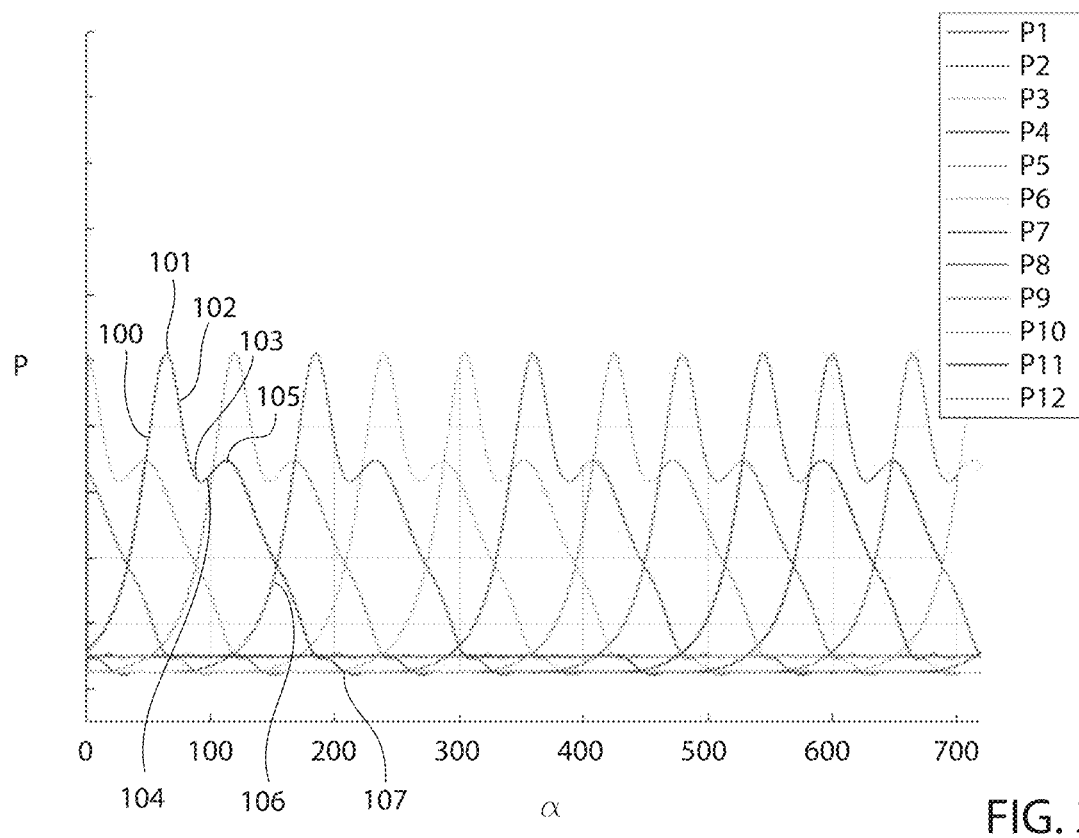
FIG. 3 illustrates the pressure trend within the cylinders of the internal combustion engine in FIG. 2 as the rotation angle of a drive shaft changes, in a first operating step of the internal combustion engine in FIG. 2.

With reference to FIG. 3 and to a condition in which the advance angles $\theta 1$, $\theta 2$ are the same and the quantities of air Q1, Q2 are the same, it is, in addition, possible to associate each cylinder 10, 11 with a graph representing the pressure trend P1, P2, P3, P4, P5, P6; P7, P8, P9, P10, P11, P12 acting on the corresponding piston 15, 16 as a function of the rotation angle $\alpha$ of the drive shaft 12.

In the example illustrated, the trends P1, P2, P3, P4, P5, P6 associated with the cylinders 10 of the bank 8 and P7, P8, P9, P10, P11, P12 associated with the cylinders 11 are the same, due to the fact that the implementations are identical.

In particular, the trends P1, P7, P2, P8, P3, P9, P4, P10, P5, P11, P6, P12 are consecutive to each other with reference to increasing values of the rotation angle $\alpha$ of the drive shaft 12.

Each trend P7 (P8, P9, P10, P11, P12) is staggered in relation to the immediately preceding respective trend P1 (P2, P3, P4, P5, P6) by a rotation angle $\alpha$ of the drive shaft 12 equal to 65 degrees of rotation of the drive shaft 12.

Each trend P2 (P3, P4, P5, P6) is staggered in relation to the immediately preceding respective trend P7 (P8, P9, P10, P11, P12) by a rotation angle $\alpha$ of the drive shaft 12 equal to 55 degrees of rotation of the drive shaft 12.

With reference to FIG. 3, each trend P1, P2, P3, P4, P5, P6, P7, P8, P9, P10, P11, P12 essentially consists of:
- an increasing segment 100;
- a maximum 101;
- a decreasing segment 102;
- a local minimum 103;
- an increasing segment 104;
- a local maximum 105 to which pressure values P1, P2, P3, P4, P5, P6; P7, P8, P9, P10, P11, P12 correspond that are less than the maximum 101 ones;
- a decreasing segment 106; and
- a minimum 107 to which pressure values P1, P2, P3, P4, P5, P6; P7, P8, P9, P10, P11, P12 correspond that are less than the minimum 105 ones and from which the subsequent segment 100 starts.

Figure 5:
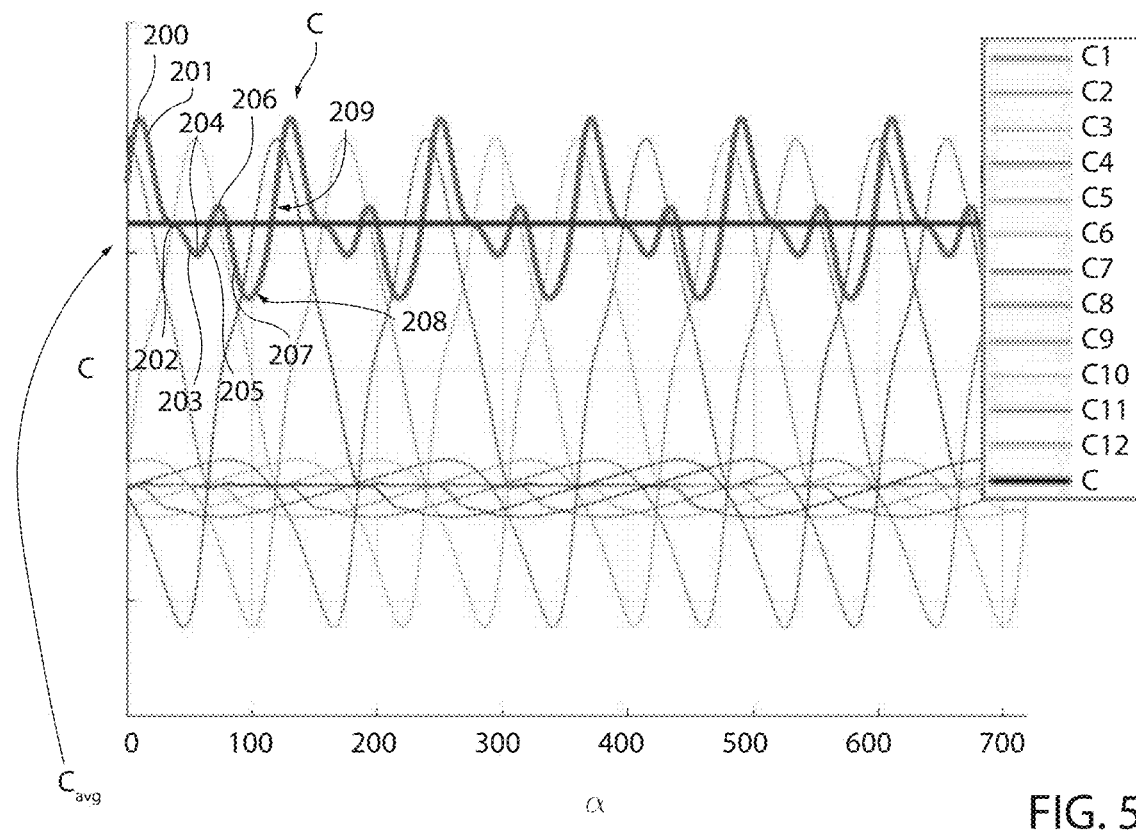
FIG. 5 illustrates the torque trend within the cylinders of the combustion engine in FIG. 2 and of the resulting torque, as the rotation angle of a drive shaft changes, in the first operating step of the internal combustion engine in FIG. 2.

With reference to FIG. 5 and to a condition in which the advance angles $\theta 1$, $\theta 2$ are the same and the quantities of air Q1, Q2 are the same, it is possible to associate each cylinder 10, 11 with a graph representing the trend of torque C1, C2, C3, C4, C5, C6; C7, C8, C9, C10, C11, C12 transmitted by the corresponding piston 15, 16 to the drive shaft 12 as a function of the rotation angle $\alpha$ of the drive shaft 12.

The torque trends C1, C7, C2, C8, C3, C9, C4, C10, C5, C11, C6, C12 are consecutive and have configurations and offsets that correspond to respective trends P1, P7, P2, P8, P3, P9, P4, P10, P5, P11, P6, P12, as the rotation angle $\alpha$ of the drive shaft 12 changes.

The overall torque C on the drive shaft 12 is equal to the sum of the graph torques C1, C2, C3, C4, C5, C6; C7, C8, C9, C10, C11, C12 generated by the cylinders 10, 11.

This overall torque C has a variable trend as the rotation angle $\alpha$ of the drive shaft 12 changes, due to the variation in the pressure inside the chambers 17, 18 and the offset between the graphs C1, C2, C3, C4, C5, C6, C7, C8, C9, C10, C11, C12.

With particular reference to FIG. 5, the trend of the resulting torque C basically comprises a regular repetition of:
- a maximum 200;
- a decreasing segment 201 with a concavity facing upwards;
- a bend 202;
- a decreasing segment 203 with a concavity facing downwards;
- a local minimum 204;
- an increasing segment 205;
- a local maximum 206 to which a resulting torque C value corresponds that is less than the maximum 200 one;
- a decreasing segment 207;
- a minimum 208 to which a resulting torque C value corresponds that is less than the maximum 204 one; and
- an increasing segment 209 ending in the subsequent maximum 200.

The overall torque C has an average value Cavg within a range of 360 degrees of the angle $\alpha$ of the drive shaft 12.

Figure 7:
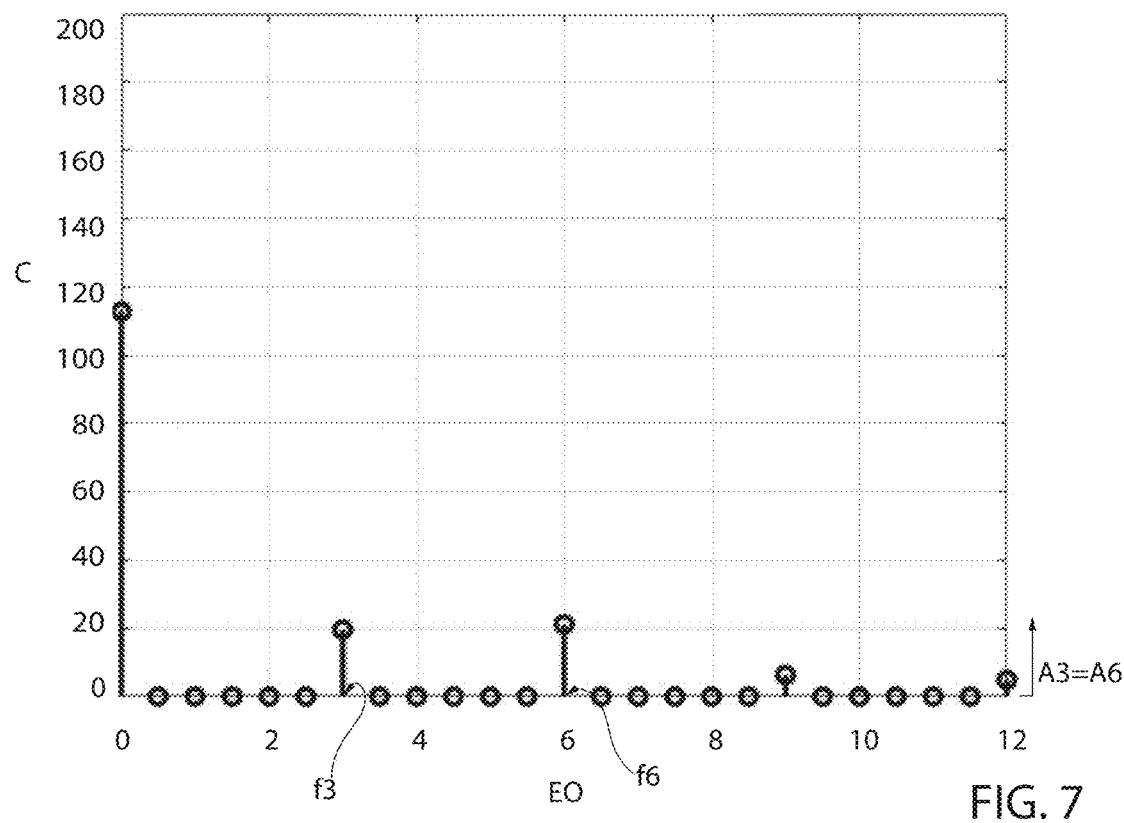
FIG. 7 illustrates the oscillation amplitude of the torque at respective multiple frequencies of a rotation frequency of the drive shaft, in the first operating step of the internal combustion engine in FIG. 2.

In a known way, the temporal trend of the torque C illustrated in FIG. 7 can be represented as a sum of multiple sinusoidal signals each having a corresponding frequency f1, f2, . . . , fn and a corresponding amplitude A1, A2, . . . , An.

In particular, each frequency fk and the relative amplitude Ak are identified as corresponding to the k-nth order, i.e. to a frequency equal to k times the rotation frequency $n/2\pi$ corresponding to the rotation speed n of the drive shaft 12.

For example, the amplitude A3 of the third order corresponding to the frequency f3 is equal to three times the rotation frequency $n/2\pi$ corresponding to the rotation speed n of the drive shaft 12.

FIG. 7 refers to a condition in which the advance angles $\theta1$, $\theta2$ are the same and the quantities of air Q1, Q2 are the same and the clutch 50 and/or accelerator 51 is not operated.

In this condition, the representation of the resulting torque C has three components having an amplitude A0, A3 and A6 and corresponding frequencies f0, f3 and f6. The amplitude A0 corresponds to the average value of the torque C and the non-variable component with the angle $\alpha$ of the resulting torque C.

Advantageously, the control unit 30 is programmed to:
- process the value of an amplitude Ak, the amplitude A3 in the example illustrated, associated with a desired frequency fk, f3 in the example illustrated;
- detect that the amplitude A3 of the signal at the frequency f3 is greater than a threshold value $A3_{th}$; and
- correct the advance angle $\theta1$ and the quantity of air Q1 and/or the advance angle $\theta2$ and the quantity of air Q2, so as to keep the average value Cavg of the resulting torque C constant at two complete rotations of the drive shaft 12 around the axis A.

As a result of this change in the advance angles $\theta1$ and/or $\theta2$ and the quantities of air Q1 and/or Q2, the trends of the torque C1, C2, C3, C4, C5, C6 are translated towards rotation angles $\alpha$ that are less than the drive shaft 12 and/or the trends of the torque C7, C8, C9, C10, C11, C12 are translated towards rotation angles $\alpha$ greater than the drive shaft 12.

As a result, the correction of the advance angles $\theta1$, $\theta2$ and of the quantities of air Q1, Q2 determines a graph of the corrected resulting torque $C_{adj}$ (FIG. 6) other than that of the resulting torque C when $\theta1=\theta2$ and Q1=Q2.

The average value Cavg of the resulting torque C and of the corrected resulting torque Cadj remains constant.

More specifically, the trends of the torques C1, C2, C3, C4, C5, C6; C7, C8, C9, C10, C11, C12 in FIG. 5 are corrected in respective trends C1adj, C2adj, C3adj, C4adj, C5adj, C6adj; C7adj, C8adj, C9adj, C10adj, C11adj, C12adj illustrated in FIG. 6.

Figure 4:
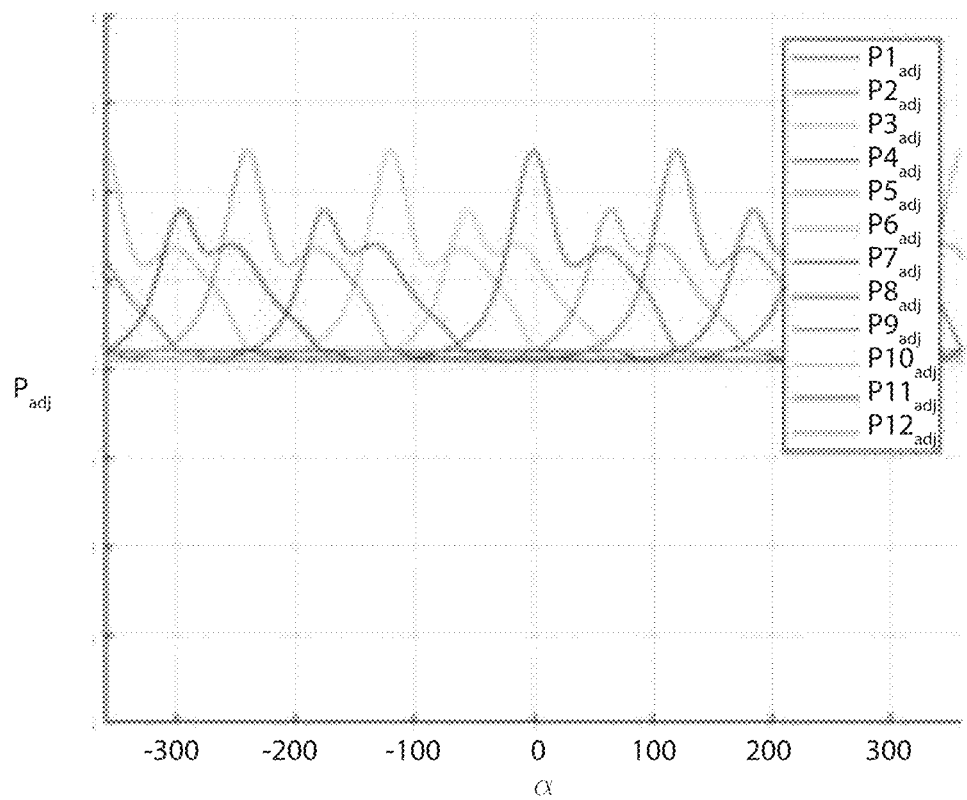
FIG. 4 illustrates the corrected pressure trend within the cylinders of the internal combustion engine in FIG. 2 as the rotation angle of a drive shaft changes, in a second operating step of the internal combustion engine in FIG. 2.

Similarly, the trends of pressures P1, P2, P3, P4, P5, P6; P7, P8, P9, P10, P11, P12 in FIG. 3 are corrected in the trends P1adj, P2adj, P3adj, P4adj, P5adj, P6adj; P7adj, P8adj, P9adj, P10adj, P11adj, P12adj illustrated in FIG. 4.

Preferably, the control unit 30 is programmed to:
- correct the advance angle $\theta1$ and quantity of air Q1, so as to keep the average value (C1+C2+C3+C4+C5+C6) avg of the sum of the torques C1, C2, C3, C4, C5, C6 constant; and
- correct the advance angle $\theta2$ and quantity of air Q2, so as to keep the average value (C7+C6+C9+C10+C11+ C12)avg of the sum of the torques C7, C8, C9, C10, C11, C12 constant and equal to the average value (C7+C6+C9+C10+C11+C12)avg of the sum of the torques C7, C8, C9, C10, C11, C12.

In this embodiment, the control unit 30 is programmed to keep the average values (C1+C2+C3+C4+C5+C6)avg and (C7+C8+C9+C10+C11+C12)avg, associated with respective banks 8, 9 balanced.

More precisely, the control unit 30 is programmed to:
- reduce the advance angle $\theta1$ remaining on the segment 151 and increase the quantity of air Q1; and
- increase the advance angle $\theta2$ remaining on the segment 151 and reduce the quantity of air Q2.

The reduction of the advance angles $\theta1$ would lead to a reduction in the average value (C1+C2+C3+C4+C5+C6)avg of the sum of the torques C1, C2, C3, C4, C5, C6 delivered by the cylinders 10 and relative pistons 11 of the bank 8. In the example illustrated, this reduction is compensated for by the increase, by basically the same amount, of the torques C1, C2, C3, C4, C5, C6 determined by the increase in the quantity of air Q1.

Similarly, the increase of the advance angles $\theta2$ would lead to an increase in the average value (C7+C8+C9+C10+ C11+C12)avg of the sum of the torques C7, C8, C9, C10, C11, C12 delivered by the cylinders 10 and relative pistons 11 of the bank 9. In the example illustrated, this increase is compensated for by the reduction, by basically the same amount, of the torques C7, C8, C9, C10, C11, C12 determined by the increase in the quantity of air Q2.

Alternatively, the control unit 30 is programmed to correct both the advance angle $\theta1$ and the quantity of air Q1 and the advance angle $\theta2$ and the quantity of air Q2, so that the average value (C1+C2+C3+C4+C5+C6)avg is different to the average value (C7+C8+C9+C10+C11+C12)avg.

In this embodiment, the control unit 30 is programmed to unbalance the average values (C1+C2+C3+C4+C5+C6)avg and (C7+C8+C9+C10+C11+C12)avg, associated with respective banks 8, 9.

In an additional embodiment, the control unit 30 is programmed to only correct the advance angle $\theta1$ and the quantity of air Q1, leaving both the advance angle $\theta2$ and the quantity of air Q2 unchanged.

In particular, the control unit 30 is programmed to reduce the advance angles $\theta1$ of the cylinders 10 by a value $\Delta\theta1$ and increase the advance angles $\theta1$ of the cylinders 11 by respective corrections $\Delta\theta1=\Delta\theta2$, and starting from an initial condition in which the advance angles $\theta1$, $\theta2$ are greater than the respective optimal and equal advance angles $\theta1^*$, $\theta2^*$.

The control unit 30 is programmed to increase the quantities of air Q1 flowing into the cylinders 10 by a value ΔQ1 and to reduce the quantity of air Q2 flowing into the cylinders 11 by respective corrections ΔQ1=ΔQ2, and to start from an initial condition in which Q1=Q2 wherein the quantities of air Q1, Q2 are the same.

It is important to highlight that in the initial condition, the above-mentioned quantity of air Q1=Q2 values are greater than those necessary to obtain the resulting torque C with an advance angle θ1*, θ2*, optimal and different to the advance angles θ1=θ2 of the initial condition. In this way, the cylinders 10 and the relative pistons 11 have a so-called torque reserve equal to the value of residual torque that they could deliver with the same quantities of air Q1, Q2 and the optimal advance angles θ1*, θ2*.

The increase in the quantity of air Q1 by a value ΔQ1 and the resulting reduction of the advance angle θ1 by a value Δθ1 causes an increase in the torque reserve of the cylinders 10 and pistons 11 of the bank 8.

In contrast, the reduction of the quantity of air Q2 by a value ΔQ2 and the resulting increase of the advance angle θ2 by a value Δθ2 causes a reduction in the torque reserve of the cylinders 15 and pistons 16 of the bank 9. In the example illustrated, the control unit 30 is programmed to correct the advance angles θ1 and the quantities of air Q1 of all the cylinders 10, and the advance angles θ2 and the quantities of air Q2 of all the cylinders 11.

In the example illustrated, the control unit 30 is also programmed to correct the advance angles θ1 and the quantities of air Q1 of all the cylinders 10—and, possibly, also the advance angles θ2 and the quantities of air Q2 of all the cylinders 11.

The above-mentioned correction preferably occurs in a condition in which the clutch 50 and/or the accelerator 51 is not operated.

Alternatively, the above-mentioned correction occurs when the control unit 30 checks that the predetermined operating parameters of the internal combustion engine 6 assume respective desired values.

The control unit 30 is also programmed not to change the advance angles θ1, θ2 and the quantities of air Q1, Q2, when the amplitude A3 is below the value $A3_{th}$.

The control unit 30 is programmed to:
repeat the detection of the amplitude A3 once, if the current value of the amplitude A3 is greater than the value $A_{th}$; and
change the advance angles θ1, θ2 and the quantities of air Q1, Q2 of the cylinders 10, 11 until the amplitude A3 is lower than the value $A_{th}$.

More precisely, the control unit 30 is programmed to repeat the detection of the amplitude A3 a maximum number $l_{max}$ of times, if at every detection the amplitude A3 is always greater than the value $A_{th}$.

In particular, the control unit 30 is programmed to:
process the minimum value $A3_{min}$ between the amplitude values A3 detected greater than the threshold value $A3_{th}$, and the value of the advance angles $θ1_{min}$, $θ2_{min}$, and minimum quantity of air $Q1_{min}$ $Q2_{min}$ adjusted corresponding to the minimum value $A3_{min}$; and
if the number of repetitions l exceeds the maximum number $l_{max}$, operate the intake valves 20, 21 and the ignition members 22, 23, so as to produce the advance angles $θ1_{min}$, $θ2_{min}$ and minimum quantity of air $Q1_{min}$ $Q2_{min}$.

The control unit 30 is, also, programmed, if the number of times l is less than the maximum $l_{max}$, to:

detect whether two consecutive values of A3 are increasing or decreasing;
if the above-mentioned two consecutive values of A3 are increasing, continue to operate the intake valves 20, 21 and the ignition members 22, 23, so as to decrease the advance angle θ1, increase the quantity of air Q1, increase the advance angle θ2 and decrease the quantity of air Q2; and
if the above-mentioned two consecutive values of A3 are decreasing, continue to operate the intake valves 20, 21 and the ignition members 22, 23 so as to increase the advance angle θ1, decrease the quantity of air Q1, decrease the advance angle θ2 and increase the quantity of air Q2.

The control unit 30 is, finally, programmed to estimate the amplitude A3 based on the value of angular speed n of the drive shaft 12 estimated thanks to a measurement made by the phonic wheel transducer 40.

More specifically, the temporal trend of the angular speed n of the drive shaft 12 can be represented as a sum of multiple sinusoidal signals each having a corresponding frequency f1, f2, . . . , fk, . . . fn and a corresponding amplitude B1, B2, . . . , Bk, . . . , Bn corresponding to the k-nth order, entirely similarly to what is described above with reference to the temporal trend of the resulting torque C.

The control unit 30 is programmed to:
process the value of the amplitude Bk, B3 in the example illustrated; and
if the value of the amplitude Bk is greater than an additional threshold value $B3_{th}$ stored in the control unit 30, detect whether the amplitude $B3_{th}$ is greater than said first threshold value $A3_{th}$.

More precisely, the control unit 30 is programmed to:
detect, at each complete rotation of the drive shaft 12 around the axis A, multiple measurements n1, n2, . . . ni of the rotation speeds n, as the respective grooves or projections 42 pass in front of the sensor 45;
select a number j greater than 2*k and less than/or equal to i of measurements n1, . . . , nj among the measurements n1, n2 . . . ni where k is the order of the frequency fk; and
estimate the value n as the average of the measurements n1, n2, . . . nj.

The control unit 40 is, in particular, programmed to:
process the values of the ignition values θ1, θ2 with a period T depending on the number of cylinders 10, 11; and
process the value of the amplitude B3 as $$B3 = \sqrt{((\Sigma_{n=0}^{N-1} x_n \times \sin(linspace(0, 2*\pi, j)) \times \frac{2 \times T_s}{T})^2 + ((\Sigma_{n=0}^{N-1} x_n \times \cos(linspace(0, 2*\pi, j)) \times \frac{2 \times T_s}{T})^2}$$

wherein:
$x_n$ is the difference between each measured value nj of the rotation speed n of the drive shaft 12 and the average of the measurements n1, n2 . . . nj;
Ts is the ratio between the period T and the number j of measurements; and
Linspace (0, 2*π, j) is a vector with j elements equally spaced apart between o and 2*π.

In use, the control unit 30 is programmed to control the intake valves 20, 21, the injection members 26, 27, the ignition members 22, 23, and the discharge valves 24, 25 of the respective cylinders 10, 11 according to a predetermined cycle depending on the angular position of the drive shaft 12. During this cycle, the thermal energy released by the combustion of the mixture is converted into mechanical energy transmitted by the pistons 15, 16 and by the latter into the respective torques C1, C2, C3, C4, C5, C6; C7, C8, C9, C10, C11, C12 transmitted to the drive shaft 12.

In particular, the control unit 30 processes the values of the advance angles θ1, θ2 with a period T depending on the number of cylinders 10, 11.

The operation of the internal combustion engine 6 is described in detail starting from a condition in which the advance angles θ1, θ2 are the same and greater than the respective, optimal advance angles θ1*, θ2* and the quantities of air Q1, Q2 are the same.

In this condition, the accelerator 51 and (or) the clutch 50 are (is) not operated and the control unit 30 has checked that the above-mentioned parameters assume the respective values.

In this condition, the graphs C1, C2, C3, C4, C5, C6, C7, C8, C9, C10, C11, C12 of the torque transmitted by the pistons 15, 16 to the drive shaft 12 are of the type illustrated in FIG. 3 and the graphs P1, P2, P3, P4, P5, P6, P7, P8, P9, P10, P11, P12 of the pressures acting on the pistons 15, 16 are of the type illustrated in FIG. 5.

In this condition, too, the torque reserve of the cylinders 10 and pistons 15 of the bank is the same as the torque reserve of the cylinders 11 and pistons 16 of the bank 9.

Specifically, the control unit 30 estimates a value of angular speed n of the shaft 12 via the phonic wheel transducer 40, and estimates the amplitude B3 based on the estimated value of angular speed n.

More precisely, the control unit 30 measures, at each rotation of the drive shaft 12, multiple measurements n1, n2, ... ni of the rotation speeds n, as the respective grooves or projections 42 pass in front of the sensor 45; and selects a number j greater than 2*k and less than/equal to i of measurements n1, ..., nj among the measurements n1, n2 ... ni, where k is the order of frequency of the amplitudes A3 and B3 equal to three in the example illustrated.

Finally, the control unit 30 estimates the value of the rotation speed n of the drive shaft 12 as the average of the measurements n1, n2, ... nj.

The control unit 40 processes, in addition, the value of the amplitude B3 as $$B3 = \sqrt{((\Sigma_{n=0}^{N-1} x_n \times \sin(linspace(0, 2*\pi, j)) \times \frac{2 \times T_s}{T})^2 + ((\Sigma_{n=0}^{N-1} x_n \times \cos(linspace(0, 2*\pi, j)) \times \frac{2 \times T_s}{T})^2}$$

wherein:

$x_n$ is the difference between each measured value nj of the rotation speed of the drive shaft 12 and the average of the measurements n1, n2, ... nj;

Ts is the ratio between the period T and the number j of measurements; and

Linspace is a vector with j elements equally spaced apart between o and 2*π.

The control unit 30 compares the value of the amplitude B3 with the threshold value $B3_{th}$ and, if the amplitude B3 is greater than the threshold value $B3_{th}$, detects the condition that the amplitude A3 is greater than the relative threshold value $A3_{th}$.

The control unit 30 checks that the values of the advance angles θ1, θ2 are located in the segment 151 i.e. they are greater than the respective, optimal advance angles θ1*, θ2*, before detecting that the amplitude A3 of the frequency signal f3 is greater than a threshold value $A3_{th}$.

If the amplitude A3 detected is greater than the threshold value $A3_{th}$, the control unit 30 corrects the advance angles θ1, θ2 and the quantities of air Q1, Q2 of the respective cylinders 10, 11.

More precisely, the control unit 30 reduces the advance angles θ1, θ2 of the respective cylinders 10, 11 and increases said quantity of air Q1, Q2, so as to keep the value of the resulting torque Cavg constant.

In particular, the control unit 30 corrects the advance angles θ1 (θ2) and the quantities of air Q1 (Q2) of all the cylinders 10 (11).

Figure 6:
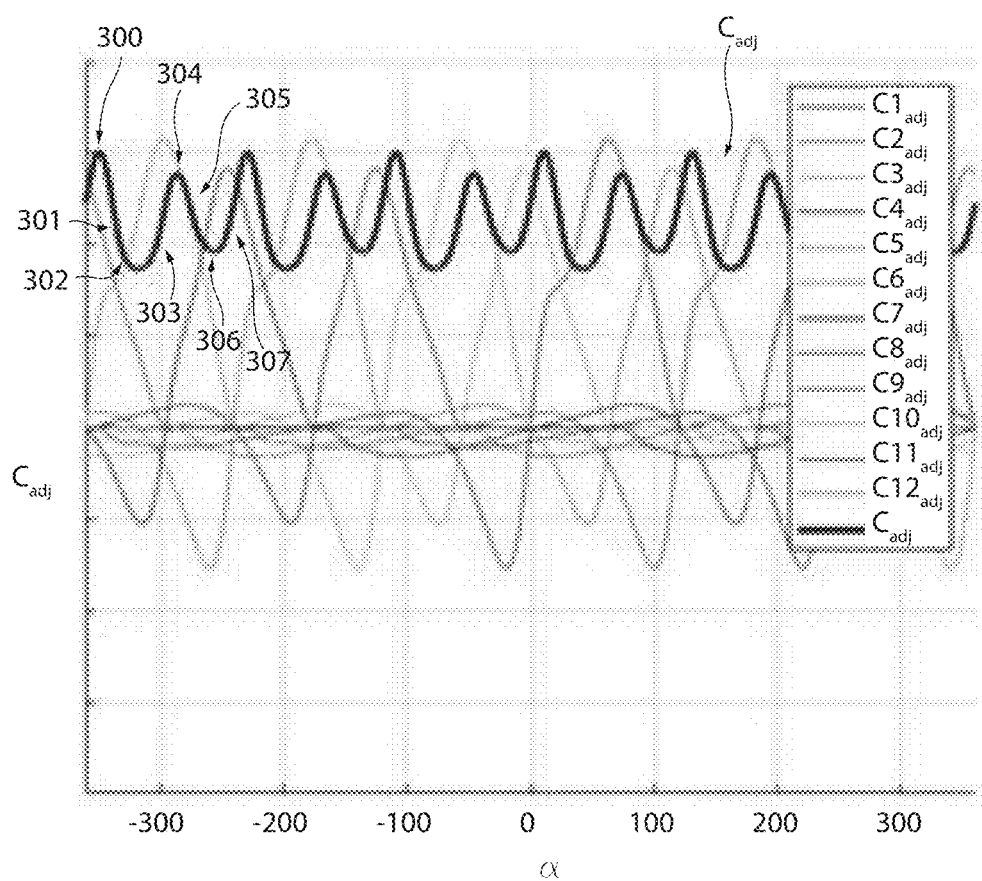
FIG. 6 illustrates the corrected torque trend within the cylinders of the internal combustion engine in FIG. 2 and the resulting torque, as the rotation angle of a drive shaft changes, in the second operating step of the internal combustion engine in FIG. 2.

As illustrated in FIG. 6, as a result of this change in the advance angles θ1, θ2 and the quantities of air Q1, Q2, the trends of the torques C1, C2, C3, C4, C5, C6 are translated towards rotation angles α that are less than the drive shaft 12 and the trends of the torques C7, C8, C9, C10, C11, C12 are translated towards rotation angles α greater than the drive shaft 12.

More specifically, the trends of the torques C1, C2, C3, C4, C5, C6; C7, C8, C9, C10, C11, C12 in FIG. 5 are corrected in the trends C1adj, C2adj, C3adj, C4adj, C5adj, C6adj; C7adj, C8adj, C9adj, C10adj, C11adj, C12adj illustrated in FIG. 6.

Similarly, the trends of pressures P1, P2, P3, P4, P5, P6; P7, P8, P9, P10, P11, P12 in FIG. 3 are corrected in the trends P1adj, P2adj, P3adj, P4adj, P5adj, P6adj; P7adj, P8adj, P9adj, P10adj, P11adj, P12adj illustrated in FIG. 4.

As a result, the correction of the advance angles θ1, θ2 and of the quantities of air Q1, Q2 determines a graph of the corrected resulting torque $C_{adj}$ other than that of the resulting torque C when θ1=θ2 and Q1=Q2.

More precisely, as a result of this change of the advance angles θ1, θ2 and of the quantities of air Q1, Q2, the trend of the corrected resulting torque $C_{adj}$ is periodic with a period of 120 degrees of the rotation angle α and basically comprises (FIG. 6), a periodic repetition of:

a maximum 300;
a decreasing segment 301 with a concavity facing upwards;
a minimum 302;
an increasing segment 303;
a maximum 304 to which a resulting torque value C corresponds that is greater than the maximum 300 one;
a decreasing segment 305;
a minimum 306 to which a resulting torque value C corresponds that is greater than the minimum 302 one; and
an increasing segment 307 ending with the subsequent maximum 301.

In particular, the difference between the values of corrected resulting torque $C_{adj}$ between the maximums 300, 304 is less than the difference between the maximums 202, 206 uncorrected resulting torque C.

The difference between the values of corrected resulting torque $C_{adj}$ between the minimums 302, 306 is less than the difference between the maximums 204, 208 of the uncorrected resulting torque C.

The control unit 30 preferably corrects the advance angle θ1 and the quantity of air Q1, so as to keep the average value (C1+C2+C3+C4+C5+C6)avg of the sum of the torques C1, C2, C3, C4, C5, C6 constant; and corrects the advance angle θ2 and quantity of air Q2, so as to keep the average value (C7+C6+C9+C10+C11+C12)avg of the sum of the torques C7, C8, C9, C10, C11, C12 constant and equal to the average value (C7+C6+C9+C10+C11+C12)avg of the sum of the torques C7, C8, C9, C10, C11, C12.

The control unit 30 thus keeps the average values (C1+C2+C3+C4+C5+C6)avg and (C7+C8+C9+C10+C11+C12)avg, associated with respective banks 8, 9, balanced.

Once the correction has been performed, the torque reserve of the cylinders 10 and pistons 15 of the bank 8 is increased. The torque reserve of the cylinders 11 and pistons 16 of the bank 9 is reduced.

Alternatively, the control unit 30 corrects both the advance angle θ1 and the quantity of air Q1 and the advance angle θ2 and the quantity of air Q2, so that the average value (C1+C2+C3+C4+C5+C6)avg is different to the average value (C7+C8+C9+C10+C11+C12)avg.

The control unit 30 thus keeps the average values (C1+C2+C3+C4+C5+C6)avg and (C7+C8+C9+C10+C11+C12)avg, associated with respective banks 8, 9, unbalanced.

In an additional embodiment, the control unit 30 only corrects the advance angle θ1 and the quantity of air Q1, leaving both the advance angle θ2 and the quantity of air Q2 unchanged.

Figure 8:
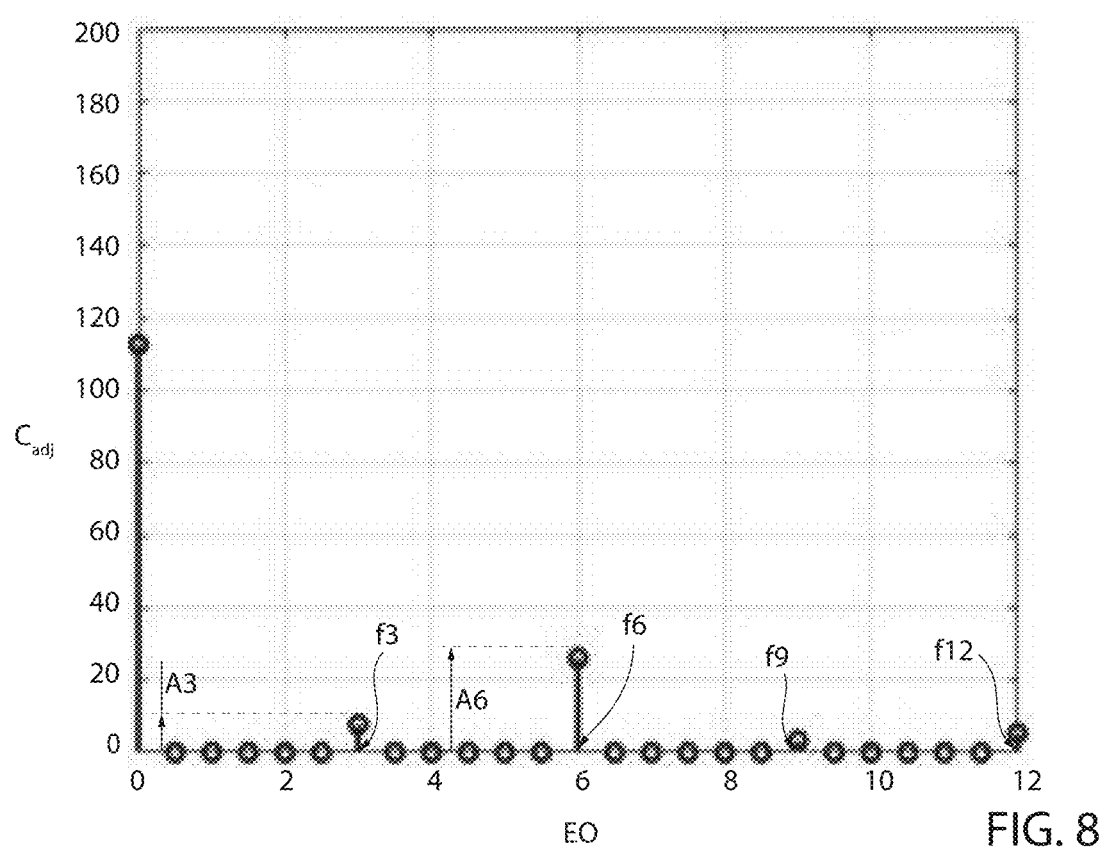
FIG. 8 illustrates the corrected oscillation amplitude of the torque at respective multiple frequencies of a rotation frequency of the drive shaft, in the second operating step of the internal combustion engine in FIG. 2.
Figure 9:
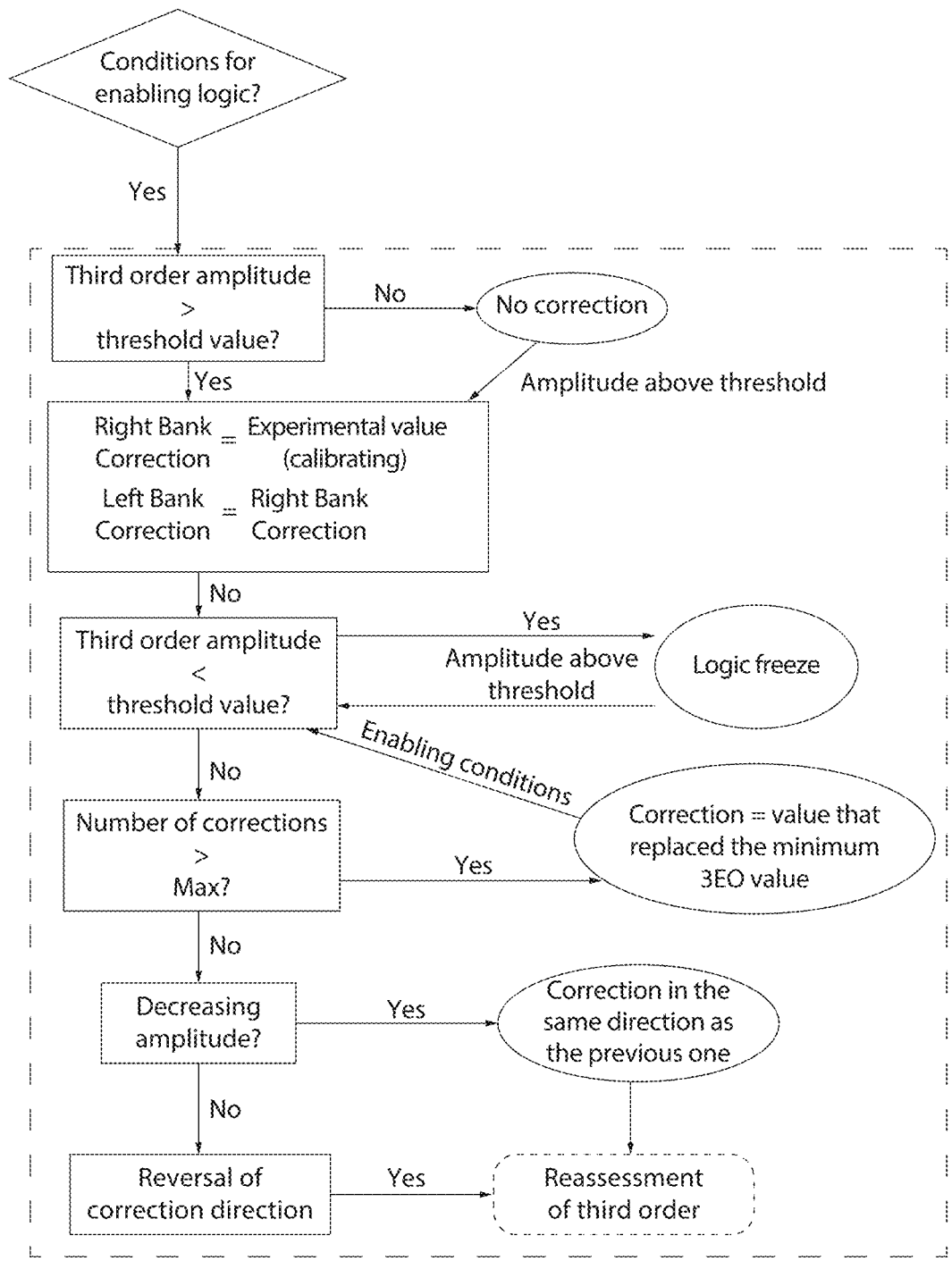
FIG. 9 is a flow chart schematically illustrating the adjustment method steps according to this invention.

With reference to FIG. 8, the representation using sine waves of the corrected resulting torque Cadj has an amplitude component A3 equal to half of the amplitude A3 of the resulting torque C.

The control unit 30 repeats the detection of the amplitude A3 a number 1 of times, if the current value of the amplitude A3 is greater than the value $A_{th}$, and, as a result, corrects the advance angles θ1, θ2 and the quantities of air Q1, Q2 of the cylinders 10, 11, until the amplitude A3 is less than the value $A_{th}$.

More precisely, the control unit 30 repeats the detection of the amplitude A3 a maximum number $l_{max}$ of times, if at every detection the amplitude A3 is always greater than the threshold value $A3_{th}$.

The control unit 30 also processes the minimum value $A3_{min}$ between the amplitude values A3 detected greater than the threshold value $A3_{th}$, and the minimum values $θ1_{min}$, $θ2_{min}$, $Q1_{min}$, $Q2_{min}$ among the corrected values of advance angles θ1, θ2 and minimum quantity of air Q1, Q2 corresponding to the minimum value $A3_{min}$.

If the number of repetitions 1 exceeds the maximum number $l_{max}$, the control unit 30 operates the intake valves 20, 21 and the ignition members 22, 23, so as to produce the advance angles $θ1_{min}$, $θ2_{min}$ and minimum quantity of air $Q1_{min}$ $Q2_{min}$.

The control unit 30 also detects, if the number of times 1 is less than the maximum $l_{max}$, whether two consecutive values of A3 are increasing or decreasing.

If the above-mentioned two consecutive values of A3 are increasing, the control unit 30 continues to operate the intake valves 20, 21 and the ignition members 22, 23, so as to decrease the advance angle θ1, increase the quantity of air Q1, increase the advance angle θ2 and decrease the quantity of air Q2.

In contrast, if the above-mentioned two consecutive values of A3 are decreasing, the control unit 30 continues to operate the intake valves 20, 21 and the ignition members 22, 23 so as to increase the advance angle θ1, decrease the quantities of air Q1, decrease the advance angle θ2 and increase the quantities of air Q2.

The advantages enabled by the adjustment method and internal combustion engine 6 manufactured according to this invention will be apparent from an examination of them.

In particular, the adjustment method according to this invention comprises the steps of:
processing the amplitude value A3 associated with the frequency f3 of the third order;
detecting that the amplitude A3 is greater than the threshold value $A3_{th}$; and
correcting the advance angles θ1 (θ2) and the first quantity of air Q1 (Q2), so as to keep the overall average torque Cavg constant.

In this way, it is possible to make the trend of overall torque C constant as the rotation angle α of the drive shaft 12 changes, thus reducing the overall vibrations associated with the operation of the internal combustion engine 6 and making the related noise more regular, especially at an idle speed.

This correction exploits the torque reserve of the cylinders 10, 11, i.e. the fact that the torque C1, C2, C3, C4, C5, C6; C7, C8, C9, C10, C11, C12 is less than the relative maximum torque $C1_{max}$, $C2_{max}$, $C3_{max}$, $C4_{max}$, $C5_{max}$, $C6_{max}$, $C7_{max}$, $C8_{max}$, $C9_{max}$, $C10_{max}$, $C11_{max}$, $C12_{max}$ before the correction of the advance angles θ1 (θ2) and the first quantity of air Q1 (Q2).

Thanks to the fact that the advance angles θ1, θ2 and the quantity of air Q1, Q2 are corrected so as not to alter the value of the resulting average torque Cavg, it is possible to make the trend of the resulting torque C more constant, without changing the value of the resulting average torque C.

Thanks to the fact that the advance angles θ1, θ2 and the quantities of air Q1, Q2 of the cylinders 10, 11 of both banks 8, 9 are corrected, a level of uniformity is achieved in the trend of the resulting torque C that is greater than what would be obtained acting on just the advance angles θ1 (θ2) and quantities of air Q1 (Q2) of the cylinders 10 (11) of just one bank 8 (9).

Thanks to the fact that they are performed only when the accelerator 51 and/or the clutch 50 is not activated and/or when the control unit 30 detects that the predetermined operating parameters of the internal combustion engine 6 assume the predetermined values, the corrections of the advance angles θ1 (θ2) and quantity of air Q1 (Q2) of the cylinders 10 (11) do not influence, in any way, the safety and driving perception of the motor vehicle 1.

If two or more consecutive values of the amplitudes Ak were increasing, the control unit 30 increases the advance angles θ1, reduces the quantities of air Q1, reduces the advance angles θ1 and increases the quantities of air Q2.

In this way, if the excessive value of the amplitude Ak were owing to an operation anomaly instead of the design configuration of the internal combustion engine 6, it is possible to change the bank 8, 9 on which the correction acts as a priority.

This is particularly advantageous when the design pressure trends P1, P2, P3, P4, P5, P6, P7, P8, P9, P10, P11, P12 are identical to each other and with the same extension compared to the rotation angle α of the drive shaft 12, like, for example, in the V12 engine with an angle of 60 degrees between the banks each consisting of six cylinders. In fact, in this case, it is not possible to establish, a priori from the cylinders, of which bank the excessive amplitude Ak is determined.

The control unit 30 estimates the amplitude A3 of the third order of the resulting torque C, based on the amplitude B3 of the third order of the angular speed n. The control unit 30 estimates, in addition, the amplitude B3 based on the values n1, n2, . . . nj of the angular speed n of the drive shaft 12 measured using the phonic wheel transducer 40.

More specifically, the values n1, n2, . . . , nj are detected as a result of the passage of a number j of grooves or projections 42 of the transducer 40 in front of the sensor 45. Since the number j is greater than double the order k associated with the amplitudes Ak, Bk. In this way, it is possible to correctly sample the signal of angular speed n of frequency k and obtain corresponding information on the amount of the amplitude Ak of the resulting torque C, using the transducer 40 commonly present on the drive shaft 12 and without needing to use special transducers.

Thanks to the fact that the control unit 30 can correct the total torque C also by only acting on the advance angles θ1 (θ2) and quantity of air Q1 of the bank 8 (9) or unbalancing the average values (C1+C2+C3+C4+C5+C6)avg and (C7+C8+C9+C10+C11+C12)avg associated with respective banks 8, 9, it is possible to obtain great flexibility relative to the methods for obtaining corrected resulting torque Cadj depending on the functional and construction peculiarities of the internal combustion engine 6.

Finally, it is clear that changes may be made to the adjustment method and internal combustion engine 6, and variations produced thereto, according to this invention that, in any case, do not depart from the scope of protection defined by the claims.

In particular, the control unit 30 could be programmed to: increase the advance angles θ1, and reduce the quantity of air Q1 flowing into the cylinders 10 and/or reduce the advance angles θ2 and increase the quantity of air Q2 flowing into the cylinders 11, so as to keep the value of the average resulting torque Cavg delivered by the internal combustion engine 6 constant.

In addition, the internal combustion engine 6 could have a number of cylinders 10, 11 other than twelve.

The internal combustion engine 6 could have a V configuration with an angle between the banks 8, 9 other than 65 degrees.

The internal combustion engine 6 could even not have a V configuration.

In this case, the method according to the invention would make it possible to detect and correct particularly high amplitudes Ak owing not to a construction peculiarity of the internal combustion engine 6, but to functional anomalies of an internal combustion engine with a different configuration.

The amplitudes Ak, Bk and the relative frequency fk could be different to the third order.

The invention claimed is:

1. A method to adjust an internal combustion engine (6) for a motor vehicle (1);
said internal combustion engine (6) comprising:
a first bank (8) comprising, in turn, at least one first cylinder (10), inside which a first piston (15) can slide; said first piston (15) being capable of sliding relative to said first cylinder (10) between a first bottom dead centre (PMI), where it defines, with said first cylinder (10), a first maximum volume chamber (17), and a first top dead centre (PMS), where the volume of said first chamber (17) is minimum;
a first adjustment member (20), which can be controlled so as to adjust a first quantity of air (Q1) flowing into said first chamber (18);
a first ignition member (22), which can be controlled so as to determine the ignition of an air and fuel mixture inside said first chamber (17);
a second bank (9) comprising, in turn, at least one second cylinder (11), inside which a second piston (16) can slide; said second piston (16) being capable of sliding between a second bottom dead centre (PMI), where it defines, with said second cylinder (11), a second maximum volume chamber (18), and a second top dead centre (PMS), where the volume of said second chamber (18) is minimum;
a second adjustment member (21), which can be controlled so as to adjust a second quantity of air (Q2) flowing into said second chamber (18) of said second cylinder (11);
said internal combustion engine (6) further comprising:
a second ignition member (23), which can be controlled so as to determine the ignition of an air and fuel mixture inside said second chamber (18);
a driving member (12), which is operatively connected to said first and second piston (15, 16), can rotate around an axis (A) and delivers, in use, a resulting torque (C, Cadj) equal to the sum of a first torque (C1, C2, C3, C4, C5, C6) transmitted by said first piston (15) to said driving member (12) and of a second torque (C7, C8, C9, C10, C11, C12) transmitted by said second piston (16) to said driving member (12);
said torque (C, Cadj) delivered by said internal combustion engine (6) being capable of being represented as the sum of a plurality of first sinusoidal signals, each having a respective first frequency (f1, . . . fk, . . . fn) and a respective first amplitude (A1, . . . Ak, . . . An);
said internal combustion engine (6) further comprising:
a control unit (30) operatively connected to said first and second adjustment member (20, 21) and to said first and second ignition members (22, 23);
said method comprising the steps of:
i) controlling said first and second adjustment member (20, 21) so as to adjust said first and second quantity of air (Q1, Q2); and
ii) operating said first and second ignition member (22, 23) with a first and second advance angle (θ1, θ2), respectively, relative to said first and second top dead centre (PMI, PMS) of the respective first and second piston (15, 16);
said first quantity of air (Q1) and said first advance angle (θ1) being associated with a value of first torque (C1, C2, C3, C4, C5, C6) transmitted by said first piston (15) to said driving member (12);
said second quantity of air (Q2) and said first advance angle (θ2) being associated with a value of second torque (C7, C8, C9, C10, C11, C12) transmitted by said second piston (16) to said driving member (12);
characterized by the steps of:
iii) processing a value of a first one (Ak) of said first amplitudes (A1, . . . Ak, . . . An) associated with a respective frequency (fk);
iv) detecting that said first amplitude (Ak) of at least one signal at a corresponding desired frequency (fk) exceeds a first threshold value ($Ak_{th}$); and
v) correcting said first advance angle (θ1) and said first quantity of air (Q1) or said second advance angle (θ2) and said second quantity of air (Q2) so as to maintain a first average value (Cavg) of said resulting torque (C, $C_{adj}$) constant at two complete rotations of said driving member (12).

2. The method according to claim 1, characterized by the step vi) of correcting said first advance angle (θ1) and said first quantity of air (Q1) so as to maintain a second average value (C1+C2+C3+C4+C5+C6)avg of said first torque (C1, C2, C3, C4, C5, C6) constant.

3. The method according to claim 1, characterized by said step v) comprising the step vii) of correcting both said first advance angle (θ1) and said first quantity of air (Q1) and said second advance angle (θ2) and said second quantity of air (Q2).

4. The method according to claim 1, wherein the development of said first torque (C1, C2, C3, C4, C5, C6) upon variation of said first advance angle (θ1) for a constant value of said first quantity of air (Q1) comprises a first increasing segment (105) and a second decreasing segment;
the development of said second torque (C7, C8, C9, C10, C11, C12) upon variation of said second advance angle (θ2) for a constant value of said first quantity of air (Q1) comprising a third increasing segment (150) and a fourth decreasing segment (151);
said step v) comprising the steps of:
viii) reducing said first advance angle (θ1) remaining on said second segment (150) and increasing said first quantity of air (Q1); and
ix) increasing said second advance angle (θ2) remaining on said fourth segment (151); and
x) reducing said second quantity of air (Q2).

5. The method according to claim 3 in that said steps v) and vii) are carried out starting from a condition in which said first advance angle and second advance angle (θ1, θ2) are the same and said first and second quantity of air (Q1, Q2) are the same.

6. The method according to claim 1, characterized by said step v) being carried out in a condition in which an accelerator (51) of said internal combustion engine (6) designed to regulate said adjustment members (22, 23) is not active and/or a clutch (50) of said internal combustion engine (6) is not engaged.

7. The method according to claim 1, characterized by the step xi) of repeating said step iv), in case said first amplitude (Ak) exceeds said first threshold value ($Ak_{th}$) at said corresponding frequency (fk).

8. The method according to claim 7, characterized by the steps of:
xii) detecting the number of consecutive times (1) that the corresponding first amplitudes (Ak) exceed said first threshold value ($Ak_{th}$);
xiii) acquiring the minimum value ($Ak_{min}$) of said amplitudes (Ak) exceeding said first threshold value ($Ak_{th}$) and the values of said first advance angle ($θ1_{min}$) and of said first quantity of air ($Q1_{min}$) corresponding to said minimum value ($Ak_{min}$); and
xiv) in case said number of consecutive times (1) exceeds a second threshold value ($1_{max}$), operating said first ignition member (22) and a first adjustment member (20) with the values of said first advance angle ($θ1_{min}$) and first quantity of air ($Q1_{min}$) corresponding to said minimum value of said amplitudes ($Ak_{min}$) exceeding said first threshold value ($Ak_{th}$).

9. The method according to claim 7, characterized by said step v) comprising the step vii) of correcting both said first advance angle (θ1) and said first quantity of air (Q1) and said second advance angle (θ2) and said second quantity of air (Q2) and further characterized by the steps of:
xv) in case two consecutive values of said first amplitudes (Ak) decrease, continuing to reduce said first advance angle (θ1), increase said first quantity of air (Q1), increase said second advance angle (θ2) and reduce said second quantity of air (Q2); and
xvi) in case two consecutive values of said first amplitudes (Ak) increase, increasing said first advance angle (θ1), reducing said first quantity of air (Q1), reducing said second advance angle (θ2) and increasing said second quantity of air (Q2).

10. The method according to claim 1, wherein said rotation speed (n) of said driving member (12) can be represented as the sum of a plurality of second sinusoidal signals, each having a respective frequency (f1, ..., fk, fn) and a respective second amplitude (B1, ..., Bk, ..., Bn);
characterized by said step iii) comprising the steps of:
xvii) processing a value of a second one (Bk) of said second amplitudes (B1, ..., Bk, ..., Bn) associated with a respective first frequency (fk); and
xviii) in case the value of said second amplitude (Bk) exceeds a second threshold value ($Bk_{th}$), detecting that said first amplitude (Ak) exceeds said first threshold value ($Ak_{th}$).

11. The method according to claim 10, characterized by the steps of:
xix) detecting a first number (i) of first values (n1, n2', ..., ni') of the angular speed (n) of said driving member (12); and
xx) estimating an average value of said angular speed (n) of said driving member (12) based on a second number (j) of second values (n1, n2, ... nj) of said plurality of values (n1, n2, ..., ni);
said second values (nj) being a subset of said first values (ni); said second values (nj) being a number greater than twice the order (k) of said first amplitude (Ak).

12. The method according to claim 11, characterized by the steps of:
xxi) processing the value of said first and second advance angle (θ1, θ2) of said first and second cylinder (10, 11) with a given period (T);
xxii) processing said value of said second amplitude (Bk) based on the following formula:

$$Bk = \sqrt{((\Sigma_{n=0}^{N-1} x_n \times \sin(linspace(0, 2*\pi, j)) \times \frac{2 \times T_s}{T})^2 + ((\Sigma_{n=0}^{N-1} x_n \times \cos(linspace(0, 2*\pi, j)) \times \frac{2 \times T_s}{T})^2}$$

wherein:
$x_n$ is the difference between each second value (nj) and the average of said second values (nj);
Ts is the ratio between said period (T) and said number (j) of said second values (nj); and
Linspace (0, 2*π, j) is a vector with j elements equally spaced apart between o and 2*π.

13. The method according to claim 1, wherein:
said internal combustion engine (6) is a multi-cylinder engine; and/or
said first piston and second piston (15, 16) can slide along respective second axes (D, C) incident to one another, converging towards said first axis (A) and defining a V; and/or
said frequency (fk) is three times the rotation frequency (f1) of said driving member (12).

14. A computer product loadable into a control unit (30) and designed, when it is executed, to implement the steps of a method according to claim 1.

15. An internal combustion engine (6), comprising:
a first bank (8) comprising, in turn, at least one first cylinder (10), inside which a first piston (15) can slide; said first piston (15) being capable of sliding relative to said first cylinder (10) between a first bottom dead centre (PMI), where it defines, with said first cylinder (10), a first maximum volume chamber (17), and a first top dead centre (PMS), where the volume of said first chamber (17) is minimum;

a first adjustment member (20), which can be controlled so as to adjust a first quantity of air (Q1) flowing into said first chamber (17);

a first ignition member (22), which can be controlled so as to determine the ignition of an air and fuel mixture inside said first chamber (17);

a second bank (9) comprising, in turn, at least one second cylinder (11), inside which a second piston (16) can slide; said second piston (16) being capable of sliding between a second bottom dead centre (PMI), where it defines, with said second cylinder (11), a second maximum volume chamber (18), and a second top dead centre (PMS), where the volume of said second chamber (19) is minimum;

a second adjustment member (21), which can be controlled so as to adjust a second quantity of air (Q2) flowing into said second chamber (18) of said second cylinder (11);

a second ignition member (23), which can be controlled so as to determine the ignition of an air and fuel mixture inside said second chamber (18); and a driving member (12), which is operatively connected to said first and second piston (15, 16), can rotate around an axis (A) and delivers, in use, a resulting torque (C, $C_{adj}$) equal to the sum of a first torque (C1, C2, C3, C4, C5, C6) transmitted by said first piston (15) to said driving member (12) and of a second torque (C7, C8, C9, C10, C11, C12) transmitted by said second piston (16) to said driving member (12);

said resulting torque (C, Cadj) being capable of being represented as the sum of a plurality of first sinusoidal signals, each having a respective first frequency (f1, . . . fk, . . . fn) and a respective first amplitude (A1, . . . Ak, . . . An);

said internal combustion engine (6) further comprising:

a control unit (30) operatively connected to said first and second adjustment members (20, 21) in order to adjust said first and second quantity of air (Q1, Q2) and to said second and first ignition member (22, 23) in order to operate said first and second ignition member (22, 23) with a first and a second advance angle (θ1, θ2), respectively, relative to said first and second top dead centre (PMI, PMS) of the respective first and second piston (15, 16);

the value of said first torque (C1, C2, C3, C4, C5, C6) transmitted by said first piston (15) to said driving member (12) being associated with said first quantity of air (Q1) and with said first advance angle (θ1);

the value of said second torque (C7, C8, C9, C10, C11, C12) transmitted by said first second to said driving member (12) being associated with said second quantity of air (Q2) and with said second advance angle (θ2);

characterized by said control unit (30) being programmed to:

process a value of a first one (Ak) of said first amplitudes (A1, . . . Ak, . . . An) associated with a respective frequency (fk);

detect that said first amplitude (Ak) of at least one signal at a corresponding desired frequency (fk) exceeds a first threshold value ($Ak_{th}$);

correct said first advance angle (θ1) and said first quantity of air (Q1) or said second advance angle (θ2) and said second quantity of air (Q2) so as to maintain a first average value (Cavg) of said resulting torque (C, Cadj) constant at two complete rotations of said driving member (12).

16. The engine according to claim 15, characterized by said control unit (30) being programmed to correct said first advance angle (θ1) and said first quantity of air (Q1) so as to maintain a second average value (C1+C2+C3+C4+C5+C6)avg of said first torque (C1, C2, C3, C4, C5, C6) constant.

17. The engine according to claim 15, characterized by said control unit (30) being programmed to correct both said first advance angle (θ1) and said first quantity of air (Q1) and said second advance angle (θ2) and said second quantity of air (Q2).

18. The engine according to claim 15, wherein the development of said first torque (C1, C2, C3, C4, C5, C6) upon variation of said first advance angle (θ1) for a constant value of said first quantity of air (Q1) comprises a first increasing segment (150) and a second decreasing segment (151);

the development of said second torque (C7, C8, C9, C10, C11, C12) upon variation of said second advance angle (θ2) for a constant value of said first quantity of air (Q1) comprising a third increasing segment (150) and a fourth decreasing segment (151);

characterized by said control unit (30) being programmed to:

reduce said first advance angle (θ1) remaining on said second segment (151) and increase said first quantity of air (Q1); and increase said second advance angle (θ2) remaining on said fourth segment (106) and reduce the second quantity of air (Q2).

19. The engine according to claim 15, characterized by a phonic wheel (40) designed to detect the angular speed (n) of said driving member (12) around said axis (A);

said phonic wheel (40) being fixed to said driving member (12) so that they rotate together, in an integral manner, around said axis (A);

said phonic wheel (40) comprising:

a plurality of grooves or projections (42) having a radial extension relative to said axis (A) and circumferentially spaced apart around said axis (A); and a sensor (45) designed to sequentially interact with said grooves or projections (42) following the rotation of said driving member (12);

said grooves or projections (42) being available in a first number (i) greater than twice the order (k) of said first amplitude (Ak) and progressively interacting, in use, with said sensor (45);

said control unit (30) being programmed to:

detect said first number (i) of first values (n1, n2, . . . , ni) of the angular speed (n) of said driving member (12) with a further frequency greater than twice said frequency (fk) associated with said amplitude (Ak) to be detected, by means of respective grooves or projections (42) of said phonic wheel (40);

estimate an average value of said angular speed (n) of said driving member (12) based on a second number (j) of second values (n1, n2, . . . nj) of said plurality of values (n1, n2, . . . , ni); said second values (j) being a subset of said first values (ni); said second number (nj) being greater than twice an order (k) of said frequency (fk); and process the value of said first and second advance angle (θ1, θ2) of said first and second cylinder (10, 11) with a given period (T);

said rotation speed (n) of said driving member (12) being capable of being represented as the sum of a plurality of second sinusoidal signals, each having a respective frequency (f1, ..., fk, fn) and a respective second amplitude (B1, ..., Bk, ..., Bn);

said control unit (30) being further programmed to:
process said value of said second amplitude (Bk) based on the following formula:

$$Bk = \sqrt{((\Sigma_{n=0}^{N-1} x_n \times \sin(linspace(0, 2*\pi, j)) \times \frac{2 \times T_s}{T})^2 + ((\Sigma_{n=0}^{N-1} x_n \times \cos(linspace(0, 2*\pi, j)) \times \frac{2 \times T_s}{T})^2}$$

wherein:

$x_n$ is the difference between each second value (nj) and the average of said second values (nj);

Ts is the ratio between said period (T) and said second number (j) of said second values (nj); and Linspace (0, 2*π, j) is a vector with said second number (j) of elements equally spaced apart between 0 and 2*π; and process a value of a second one (Bk) of said second amplitudes (B1, ..., Bk, ..., Bn) associated with a respective first frequency (fk); and in case the value of said second amplitude (Bk) exceeds a second threshold value ($Bk_{th}$), detect that said first amplitude (Ak) exceeds said first threshold value ($Ak_{th}$).

20. The engine according to claim 15, characterized by:
said internal combustion engine (6) being a multi-cylinder engine; and
said first piston and second piston (15, 16) being able to slide along respective second axes (B, C) incident to one another, converging towards said first axis (A) and defining a V;

and/or characterized by:
said second axes (B, C) defining a 65-degree angle between them; and
said frequency (fk) being three times the rotation frequency of said driving member (12).

21. The engine according to claim 15, characterized by said first bank (8) comprising a plurality of first cylinders (10), inside which respective first pistons (15) can slide and which are associated with respective first pressure trends (P1, P2, P3, P4, P5, P6);

said second bank (9) comprising a plurality of second cylinders (11), inside which respective second pistons (16) can slide and which are associated with respective second pressure trends (P7, P8, P9, P10, P11, P12);

said first pressure trends (P1, P2, P3, P4, P5, P6) being alternated with said second pressure trends (P7, P8, P9, P10, P11, P12) as a rotation angle (α) of said driving member (12) changes;

each second pressure trend (P7, P8, P9, P10, P11, P12) being staggered relative to the respective first pressure trend (P1, P2, P3, P4, P5, P6) immediately prior to a first value of said rotation angle (α) of said driving member (12);

each first pressure trend (P1, P2, P3, P4, P5, P6) being staggered relative to the respective second pressure trend (P7, P8, P9, P10, P11, P12) immediately prior to a second value of said rotation angle (α) of said driving member (12), which is different from said first value.

* * * * *